(12) United States Patent
Hoeggerl et al.

(10) Patent No.: US 7,549,491 B2
(45) Date of Patent: Jun. 23, 2009

(54) HARD MATERIAL BIT

(75) Inventors: Klaus Hoeggerl, Finning (DE); Olaf Koch, Kaufering (DE); Thorsten Assel, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 99 days.

(21) Appl. No.: 11/796,042

(22) Filed: Apr. 25, 2007

(65) Prior Publication Data
US 2007/0251733 A1    Nov. 1, 2007

(30) Foreign Application Priority Data
Apr. 27, 2006  (DE)  ............... 10 2006 000 201

(51) Int. Cl.
*E21B 10/36*    (2006.01)

(52) U.S. Cl. ..................... 175/415; 175/435

(58) Field of Classification Search ............. 175/415, 175/420, 435
See application file for complete search history.

(56) References Cited

U.S. PATENT DOCUMENTS

| 5,375,672 A | * | 12/1994 | Peay et al. ............... 175/420.1 |
| 2001/0013430 A1 | * | 8/2001 | Hauptmann et al. ......... 175/415 |

* cited by examiner

*Primary Examiner*—William P Neuder
(74) *Attorney, Agent, or Firm*—Abelman, Frayne & Schwab

(57) ABSTRACT

A hard material bit for a rotary-percussion tool (2) includes at least one cutting edge (3), a bottom surface (6) located opposite the at least one cutting edge (3), and at least one attachment surface (8) and at least one free surface (10) both extending transverse to the bottom surface (6) and forming, respectively, a piecewise extending first chamfer (9a) and second chamfer (9b), with the second chamfer (9b) having a width greater than a width of the first chamfer (9a).

5 Claims, 3 Drawing Sheets

HARD MATERIAL BIT

BACKGROUND OF THE INVENTION

1. Field of the Invention

The present invention relates to a hard material bit for a rotary-percussion tool, in particular for a rotary-percussion drill having a diameter from 4 mm to 45 mm and used in a rotary percussion power tool. The present invention also relates to a rotary percussion power tool provided with a hard material bit.

2. Description of the Prior Art

Usually, the rotary-percussion drills of the type described above and which are used in rotary-percussion power tools, have a chisel-shaped hard metal plate that is secured in the shaft end of a drill. The hard metal plate is brazed in a receiving slot extending diametrically through the shaft end along its bottom surface and two, diametrically opposite attachment surfaces. Large variations of temperatures, which are observed during assembly works and percussion drilling, result, because of different heat expansion coefficients of the hard material bit and the shaft end, in high internal stresses in a hard solder that connects the hard material bit with the shaft end, and this can lead to failure of the tool.

German Publication DE102089631 discloses a plate-shaped hard material bit having a bottom surface, which is located opposite the cutting edges and two attachment surfaces extending transverse to the bottom surface. Between the bottom surface and the two attachment surfaces, there are provided, respectively, two chamfers associated with inner rims of the receiving slot formed in the shaft end. The free surfaces, which extend perpendicular to both the bottom surface and to the attachment surfaces, pass, without chamfers, into the bottom surface.

German publication DE4419641 discloses a compact hard material bit with cutting edges which is butt-brazed to the base surface of the drill shaft with its bottom surface without chamfer. German publication DE10006936 discloses a rotary-percussion drill specifically designed for drilling holes in a reinforced concrete and provided with an X-shaped hard material bit formed of a sintered material and brazed in a matching X-shaped mortise formed in the shaft end over two, diametrically opposite attachment surfaces and a bottom surface and which is further butt-brazed to the base surface of the shaft end along sectors of two diametrically opposite free surfaces along the bottom surface. The matching X-shaped hard material bit according to DE10006932 has, in the bottom surface opposite the cutting edges, a chamfer only on the attachment surfaces.

German publication DE4442266 discloses a cross-shaped hard material bit with a uniformly extending chamfer of the same width that is provided in the bottom surface.

An object of the invention is a hard material bit for a rotary-percussion tool for drilling holes in reinforced concrete and having an increased service life.

SUMMARY OF THE INVENTION

This and other objects of the present invention, which will become apparent hereinafter, are achieved by providing a hard material bit for a rotary-percussion tool and which includes at least one cutting edge, a bottom surface located opposite the at least one cutting edge, at least one attachment surface extending transverse to the bottom surface and forming a piecewise extending first chamfer, and at least one free surface extending likewise transverse to the bottom surface and forming a piecewise extending second chamfer having a width greater than a width of the first chamfer.

With a wide second chamfer provided on the free surface, the hard solder extends, with a butt-brazing that is provided at the shaft end in this sector, over a wedge-shaped, axially widening, radial rim region. As can be shown with a corresponding simulation according to the finite-element-method (FEM), the von-Mises reference stress and the hydrostatic stress condition, which should be considered as failure criteria at brazing, have no extreme values at the rim where primarily, the fissures are initiated. In addition, the wedge-shaped, axially widening, radial rim region provides for a definite application and uniform distribution of the small amount of the hard solder which is used during brazing in mass production.

Advantageously, the width of the second chamfer amounts to between a double and five times of the width of the first chamfer, preferably to a double. Thereby, the chamfer volume of the wedge-shaped radial rim region, which is proportional to a square of the second chamfer width, is substantially greater than the chamfer volume of the first chamfer which is associated, during brazing, with the inner rim of the shaft end, which has relatively large tolerances.

Advantageously, a chamfer angle relative to the drill axis is within a range of from 30° to 60°, preferably 45° that corresponds to the shear stress component of the stress tensor in the hard solder.

Advantageously, the hard material bit has an X-shaped profile with the first chamfer being formed by two diametrically opposite attachment surfaces, which are formed as concave surfaces, and the second, wider chamfer being formed by two diametrically opposite free surfaces which are also formed as concave surfaces and, advantageously, form the discharge groove. Thereby, removal of a large discharge volume of the removable drillings becomes possible.

Advantageously, the hard material bit is connectable with the drill shaft end in a material-locking manner, advantageously, is brazed to the shaft end with bronze. This permits to produce a rotary percussion tool with an optimal service life.

Advantageously, the X-shaped hard material bit brazed in the X-shaped mortise in the shaft end over the two, diametrically opposite attachment surfaces, the first chamfer and the bottom surface, and is butt-brazed to a base surface of the shaft end, which extends radially beyond the base surface of the bit, along two sectors of the diametrically opposite free surfaces over the bottom surface and the second chamfers. Thereby, a rotary-percussion tool which has an optimal service life when used for drilling holes in the reenforced concrete, is produced.

The novel features of the present invention which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
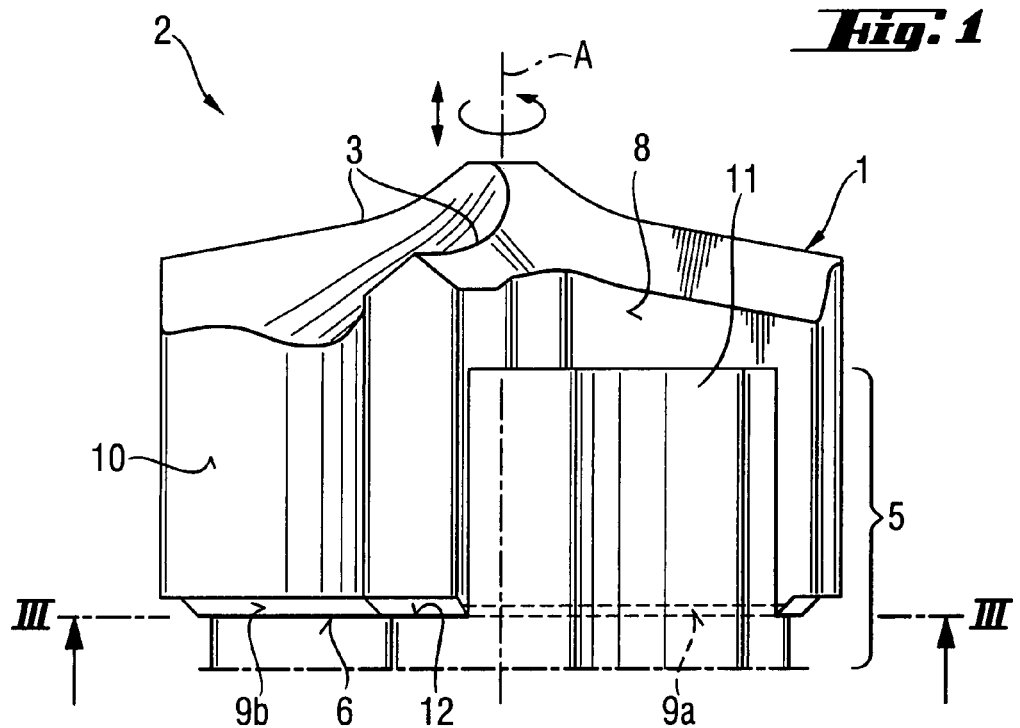
FIG. 1 a side view of a rotary-percussion tool with a hard material bit according to the present invention.
Figure 2:
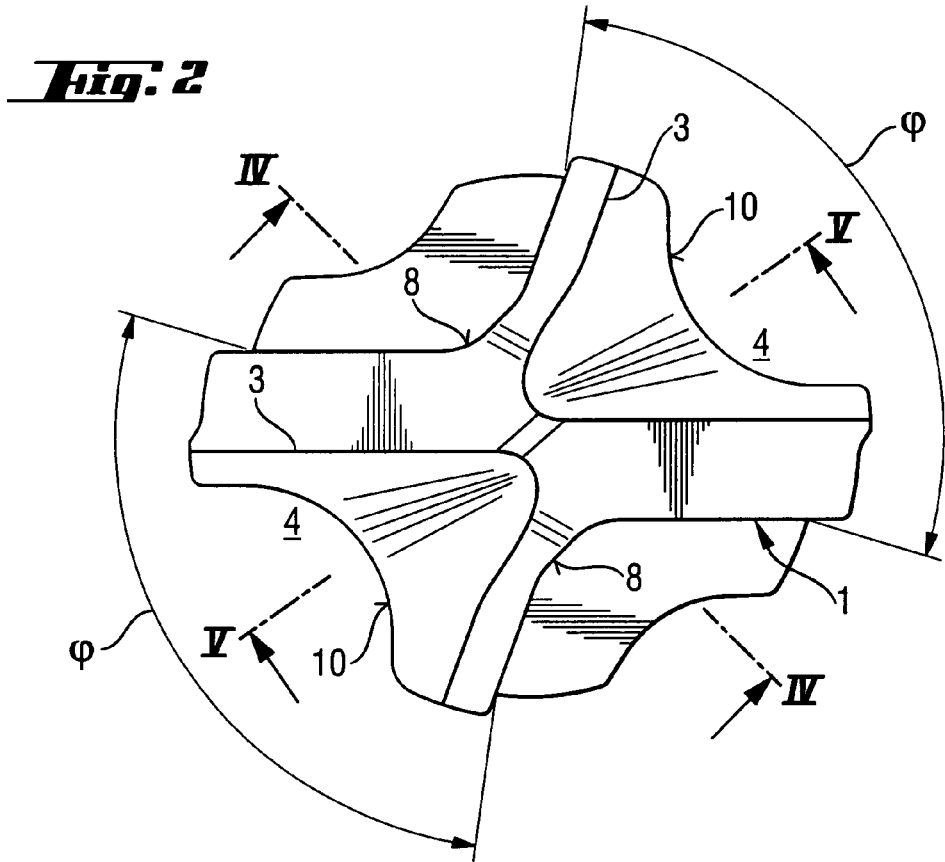
FIG. 2 a plan view of the tool shown in FIG. 1.
Figure 3:
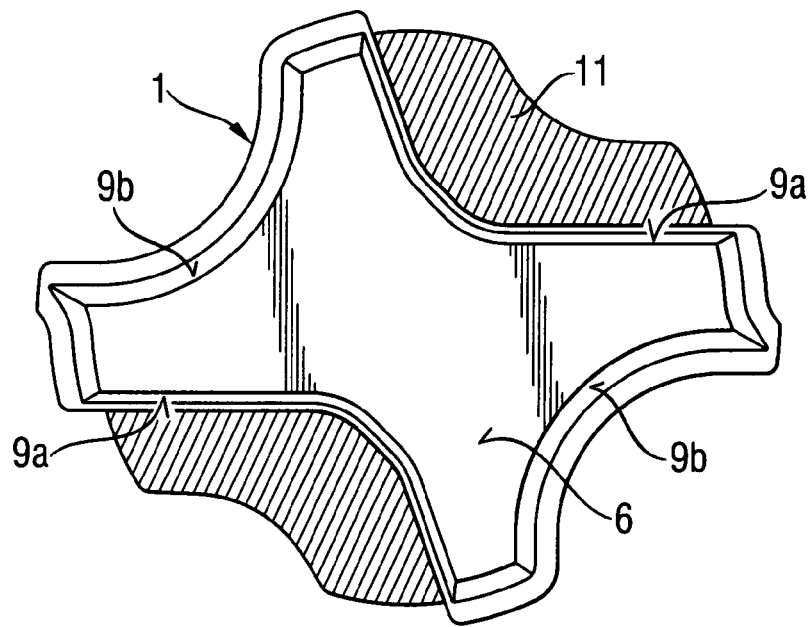
FIG. 3 a cross-sectional view along line III-III in FIG. 1.
Figure 4:
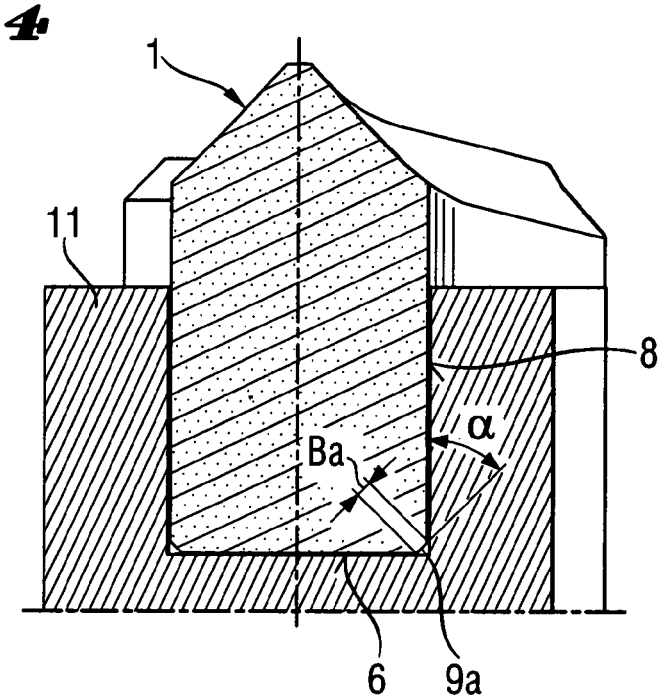
FIG. 4 a cross-sectional view along line IV-IV in FIG. 2.
Figure 5:
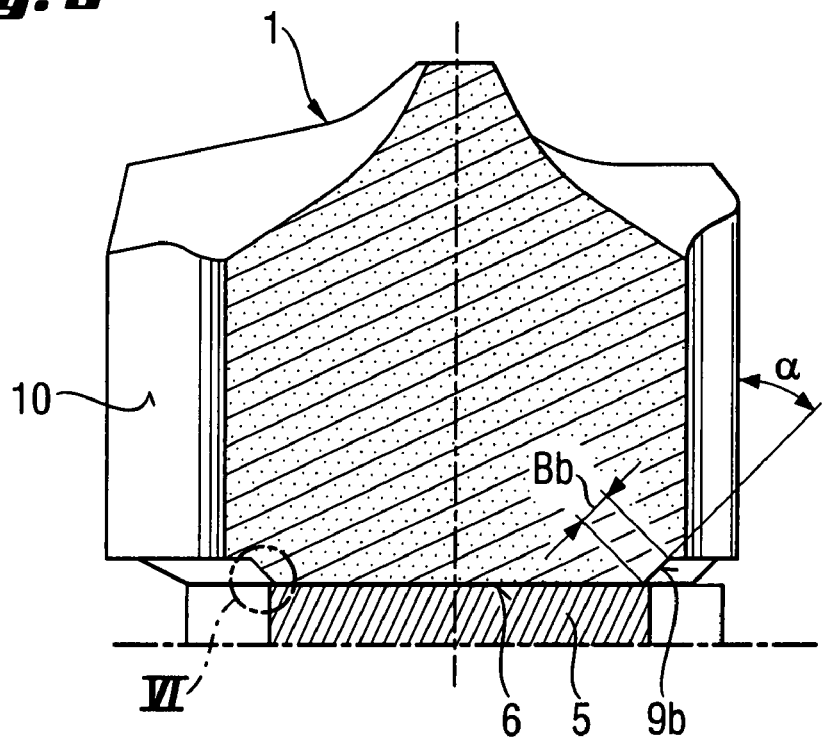
FIG. 5 a cross-sectional view along line V-V in FIG. 2.
Figure 6:
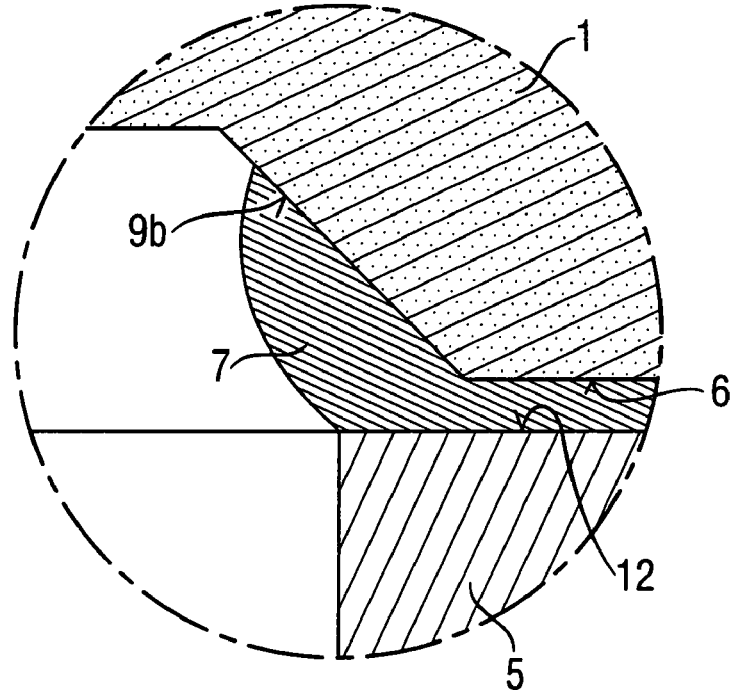
FIG. 6 a detail VI in FIG. 5.

A hard material bit 1 according to the present invention and which is shown in its entirety in FIGS. 1-6, is designed for use with only schematically shown rotary-percussion tool 2 formed as a rotary drilling chisel and rotatable about an axis A. The bit 1 has two X-shaped cutting edges 3 and two diametrically opposite main discharge grooves 4. The hard material bit 1 is connected with a shaft end 5 of the rotary-percussion tool 2 at its bottom surface 6 in a material-locking manner, being brazed thereto with a hard solder 7 in the form of bronze. Two concave attachment surfaces 8, which extend transverse to the bottom surface 6, form a first, piecewise circumferentially extending chamfer 9*a* having a width Ba, and two concave free surfaces 10, which likewise extend transverse to the bottom surface 6, form a second, piecewise circumferentially extending chamfer 9*b* having a width Bb twice of the width Ba of the first chamber 9*a*. A chamfer angle α with respect to the axis A is equal to 45°. The X-shaped, hard material bit 1 is brazed in a matching-shaped mortise 11 in the steel shaft end 5 over the two diametrically opposite attachment surfaces 8, the first chamfer 9*a*, and the bottom surface 6. The hard material bit 1 is also butt-brazed to a base surface 12 of the shaft end 5 which extends radially beyond the bottom surface 6 of the bit 1, along two sectors 4 of both diametrically opposite free surfaces 10 over the bottom surface 6 and the second chamfer 9*b*.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A hard material bit for a rotary-percussion tool (2), comprising at least one cutting edge (3); a bottom surface (6) located opposite the at least one cutting edge (3); at least one attachment surface (8) extending transverse to the bottom surface (6) and forming a piecewise extending first chamfer (9*a*); and at least one free surface (10) extending likewise transverse to the bottom surface (6) and forming a piecewise extending second chamfer (9*b*) having a width greater than a width of the first chamfer (9*a*), wherein the first chamfer (9*a*) and the second chamfer (9*b*) are arranged next to the bottom surface (6).

2. A hard material bit according to claim 1, wherein the width (Bb) of the second chamfer (9*b*) amounts to between a double and five times of the width (Ba) of the first chamfer (9*a*).

3. A hard material bit according to claim 1, wherein a chamfer angle (α) relative to a tool axis (A) is within a range from 30° to 60°.

4. A hard material bit for a rotary-percussion tool (2), comprising at least one cutting edge (3); a bottom surface (6) located opposite the at least one cutting edge (3); at least one attachment surface (8) extending transverse to the bottom surface (6) and forming a piecewise extending first chamfer (9*a*); and at least one free surface (10) extending likewise transverse to the bottom surface (6) and forming a piecewise extending second chamfer (9*b*) having a width greater than a width of the first chamfer (9*a*), wherein the hard material bit has an X-shaped profile, and wherein the first chamfer (9*a*) is formed by two attachment surfaces (8) located diametrically opposite each other, formed as concave surfaces, and the second chamfer (9*b*) is formed by two free surfaces (10) located diametrically opposite each other, formed as concave surfaces.

5. A rotary-percussion tool, comprising a shaft end (5) having an X-shaped mortise (11); and a hard material bit (1) having a matching X-shaped profile and connectable with the shaft end (5) in a material-locking manner by brazing, the hard material bit (1) including cutting edge means (3), a bottom surface (6) located opposite the cutting edge means (3), at least two concave attachment surfaces (8) extending transverse to the bottom surface (6), located diametrically opposite each other and forming a first chamfer (9*a*), and at least two concave free surfaces (10) extending likewise transverse to the bottom surface (6), located opposite each other and forming a second chamfer (9*b*) having a width greater than a width of the first chamfer (9*a*), wherein the X-shaped hard material bit (1) is brazed in the X-shaped mortise (11) in the shaft end (5) over the two, diametrically opposite attachment surfaces (8), the first chamfer (9*a*) and the bottom surface (6), and is butt-brazed to a base surface (12) of the shaft end (5) which extends radially beyond the base surface (6) of the bit (1), along two sectors (4) of the diametrically opposite free surfaces (10) over the bottom surface (6) and the second chamfer (9*b*).

* * * * *